United States Patent [19]

Dewdney et al.

[11] 3,986,985

[45] Oct. 19, 1976

[54] CATALYSTS FOR HYDROGENATION

[75] Inventors: Thomas Gordon Dewdney; Dennis Albert Dowden, both of Stockton-on-Tees; Wyndham Morris, Stockport, all of England

[73] Assignee: Imperial Chemical Industries Limited, London, England

[22] Filed: June 17, 1974

[21] Appl. No.: 480,274

[30] Foreign Application Priority Data
Sept. 12, 1973 United Kingdom............... 42881/73

[52] U.S. Cl............................. 252/472; 260/583 K
[51] Int. Cl.².......................................... B01J 23/74
[58] Field of Search................ 252/472; 260/583 K; 106/55

[56] References Cited
UNITED STATES PATENTS

| | | | |
|---|---|---|---|
| 2,661,338 | 12/1953 | Lanning.......................... | 252/472 X |
| 2,683,726 | 7/1954 | McGrath et al. .................. | 252/472 |
| 3,644,216 | 2/1972 | Egalon et al..................... | 252/472 X |

FOREIGN PATENTS OR APPLICATIONS

| | | | |
|---|---|---|---|
| 2,119,621 | 7/1972 | France............................... | 252/472 |
| 894,751 | 4/1962 | United Kingdom................. | 252/472 |
| 1,317,464 | 5/1973 | United Kingdom................. | 252/472 |

Primary Examiner—W. J. Shine
Attorney, Agent, or Firm—Cushman, Darby & Cushman

[57] ABSTRACT

A fused and solidified iron oxide catalyst containing at least 96.5% of iron oxide having an atomic ratio of oxygen to iron of 1.2:1 to 1.4:1 is activated by heating in hydrogen and used for the hydrogenation of organic compounds especially of adiponitrile to hexamethylene diamine.

10 Claims, No Drawings

CATALYSTS FOR HYDROGENATION

THE INVENTION relates to iron catalysts and to their use in hydrogenation reactions, especially in the hydrogenation of organic compounds, and particularly of nitriles to amines.

It has previously been proposed to use iron catalysts in the hydrogenation of nitriles and, more especially, in the hydrogenation of adiponitrile, either partially to amino-capronitrile or completely to hexamethylene diamine. German Pat. No. 848,654 describes the hydrogenation of adiponitrile in the presence of toluene and liquid ammonia at 85° C to give aminocapronitrile and a minor proportion of hexamethylene diamine using an iron catalyst precipitated on pumice and reduced at 350° C. British patent specification No. 728,599 relates to the catalytic hydrogenation of nitriles to amines, especially of adiponitrile to hexamethylene diamine, using an hydrogenating gas containing carbon monoxide to the extent of 10 to 200 parts per million of hydrogen by volume. Particularly suitable hydrogenation catalysts are those known or thought to form carbonyls during the reaction, including iron. British patent specification No. 894,751 relates (inter alia) to the hydrogenation of compounds containing nitrogenous groups reducible to amino groups, including nitriles, and specifically adiponitrile, in the presence of a metal hydrogenation catalyst which has been sintered prior to the hydrogenation. Especially suitable catalyst metals include iron, and the metal compounds after sintering, usually in the form of their oxides, are treated with hydrogen at 250° to 600° C until the oxide has been practically completely reduced to metal. British patent specification No. 1,123,530 discloses the use of a 100% $Fe_3O_4$ catalyst in the hydrogenation of adiponitrile to hexamethylene diamine. British patent specification No. 1,317,464 relates to catalytically hydrogenating adiponitrile to hexamethylene diamine by feeding adiponitrile, ammonia and hydrogen in the supercritical vapour phase to a reactor operating at 100° to 200° C at superatmospheric pressure and containing a granular catalyst comprising an iron compound which has been activated by contact with hydrogen at a temperature not above 600° C and which is capable of being reduced to elemental iron under the conditions of the catalytic hydrogenation reaction. French Pat. No. 2,119,621 describes a similar process but in which the iron compound is activated in the presence of hydrogen containing 0.001 to 10% by volume of ammonia.

Hexamethylene diamine is a valuable intermediate and is used particularly for polycondensation with dicarboxylic acids to give polyamides, especially with adipic acid to give polyhexamethylene adipamide (nylon 6,6). High purity in th polyamides is very desirable especially when the polyamides, as is frequently the case with nylon 6,6 are to be melt spun into fibres. This means that intermediates from which the polyamides are derived must also be of as high purity as possible. Impurities in hexamethylene diamine for use in fibre-grade polyamides can be tolerated in only very small amounts. The usual method of purifying hexamethylene diamine is by fractional distillation but, since the impurities frequently have boiling points close to that of hexamethylene diamine itself, efficient fractionating columns with a large number of theoretical plates are necessary in order to achieve effective separation. Such refining equipment is expensive to install and to operate. Moreover, the size of the equipment required, and hence its cost, increases with the proportion of impurity to be removed. Hence it is desirable to keep the impurity formed in the hydrogenation of adiponitrile to as low a level as possible. Moreover any increase in the impurity level will, of course, limit the amount of crude material which can be handled by an existing refinery.

We have found when using iron catalyst for the hydrogenation of adiponitrile that the impurity level in the resulting hexamethylene diamine can be controlled advantageously by the use of particular iron catalysts.

According to our invention a particularly suitable catalyst composition for use in the hydrogenation of organic compounds is a fused and solidified iron oxide in the form of particles suitable for use in a fixed bed of catalyst, the fused material containing not less than 96.5% of iron oxide, which oxide has an atomic ratio of oxygen to iron within the range 1.2 : 1 to 1.4 : 1.

Preferably the fused material contains not less than 97.5% of iron oxide. The atomic ratio of oxygen to iron in the iron oxide of the fused and solidified material preferably falls within the range 1.30 : 1 to 1.39 : 1. A ratio of about 1.33 : 1, corresponding with the composition of magnetite, is particularly suitable but ratios from this value up to 1.37 : 1 are also particularly suitable. Desirably the fused and solidified iron oxide is substantially free from haematite, and in this connection reference is made to the phase diagrams of iron/iron oxide/ oxygen systems, for example as displayed in L.S. Darken and R.W. Gurry in the Journal of the American Chemical Society, volume 68, page 799 (1946). Advantageously the fused and solidified iron oxide has the crystal structure of a spinel.

The composition of the fused material may be controlled by controlling the composition of the feed to the fusion step. Fusion may be effected, for example, electrothermally by means of electrodes, especially iron electrodes, inserted in the material to be fused. Fusion takes place at temperatures above about 1380° C and temperatures up to 1600° C or above may be used depending on the composition of the feed. When iron electrodes are used they may melt partially and become incorporated in the fused material thus affecting its composition. The composition of the fused material may also be controlled to some extent by controlling the oxygen content of the atmosphere in the vessel in which fusion takes place.

The material fed to the fusion step is an iron oxide or mixture of iron oxides or a mixture of an iron oxide and metallic iron. A particularly suitable feed is a magnetite, especially a naturally occurring magnetite ore. A Swedish magnetite ore wih a sufficiently high iron oxide content to give a fused material containing not less than 96.5% of iron oxide is a very suitable feed. It is preferred not to make any additions, other than iron oxide or iron, to the feed before or during fusion, as is done, for example, when promoters are added to iron oxides in the manufacture of ammonia synthesis catalysts.

The fused material is allowed to solidify and is then crushed and sized into a suitable particle size range. The appropriate size range depends on the way in which the catalyst is to be used. Where it is to be used as a stationary catalyst through which hydrogen gas and the material to be hydrogenated are caused to flow, as is usual in the hydrogenation of adiponitrile, material within the size range 3 to 20 mesh (BSS), preferably 5 to 16 mesh, and more preferably 5 to 12 mesh, is generally suitable.

Prior to use the catalyst composition of our invention is activated by reducing at least a part of the iron oxide to metallic iron by heating it in the presence of hydrogen at a temperature above 200° C but not above 600° C. Activation is preferably continued until at least 85% by weight of the available oxygen in the iron has been removed and may be continued until substantially all, for example from 95 to 98% of the available oxygen has been removed. During the activation it is desirable to prevent back-diffusion of water-vapour formed.

If desired the hydrogen used for activation may contain a proportion of ammonia. Thus, the hydrogen fed to the activation may contain, for example, from 0.25% to 25% by volume of ammonia. At the temperatures used and in the presence of activated catalyst a proportion of ammonia will be cracked to nitrogen and hydrogen, so that the proportion of ammonia in the hydrogen leaving the activation vessel may be lower than that entering it. However, at pressures above about 4 atmospheres the proportion of ammonia cracked is less than 5%. Activation in the presence of ammonia generally leads to a more active catalyst of higher surface area.

A preferred temperature for activation is from 250° to 500° C. The activation pressure is not critical. Activation may be effected at atmospheric pressure or, if desired, under pressure, for example at pressures up to 15 atmospheres or even at pressures as high as 500 atmospheres.

The activity of the catalyst affects the rate at which adiponitrile is hydrogenated. Although the highest activity is not necessarily desired in every case, since the rate at which adiponitrile can be hydrogenated may be limited by other factors, the degree of activity is susceptible to control. The degree of activity of the catalyst depends in the first place on the proportion of the available oxygen in the iron oxide which is removed during activation. Preferably at least 85% by weight of the available oxygen is removed, and more preferably substantially all, that is at least 95% by weight, is removed. Secondly, however, the activity of the catalyst may be related to its surface area, and increased surface area, if this is desired, may be achieved in various ways.

As already stated a proportion of ammonia in the activating hydrogen leads to a more active catalyst of higher surface area. We have found that for optimum effect the proportion of ammonia should be at least 1.5% by volume. Increases in the proportion above this level do not have any very significant effect, but equally are not deleterious. If ammonia is used, we prefer that the proportion in the activating hydrogen feed is in the range 1.5% to 15% by volume.

The proportion of water in the activating hydrogen should be kept low. Since water is formed during the reduction of iron oxide, where it is desired to recirculate the activating hydrogen it is necessary to first cool in to condense out water vapour and then to reheat it to the activating temperature. If the activating hydrogen as fed to the heated catalyst contains too high a proportion of water, the highest degree of reduction of the oxide cannot be achieved, and the surface area of the activated catalyst is limited. We have found that for the greatest degree of activity of the catalyst, the proportion of water in the activating hydrogen feed should be less than 1% by volume, and preferably less than 0.5% by volume.

Within the limits of temperature prescribed, the temperature does not affect the degree of reduction of the oxide which can be achieved, provided sufficient time is allowed, but the rate of activation increases with temperature. However, increase in temperature leads to a decrease in the surface area of the catalyst, and for the highest activity we prefer to limit the activation temperature to the range 275° to 325° C in the absence of ammonia, and to 325° C to 375° C in the presence of ammonia. On the other hand these temperature ranges involve rather low activation rates and in practice rather higher temperature ranges may be preferred in order to achieve a higher activation rate with some sacrifice of surface area of catalyst.

As the rate at which the activating hydrogen is passed over the catalyst is increased so does the rate of activation increase, without, however, affecting the degree of reduction of the oxide which can ultimately be achieved. However, the surface area of the catalyst also increases with the rate of passage of the activating gas. We have found that to achieve a high surface area the rate of passage of the activating hydrogen should be at least 7.5 ml/min/g. of catalyst oxide and preferably at least 15 ml/min/g., especially 15 to 25 ml/min/g. Thus the rather low rate of activation involved in limiting the activation temperature in order to achieve high surface area may be offset by using a high circulation rate of activating hydrogen.

In practice, however, the circulation rate may be restricted by limitations in the equipment, and with such a restriction the activation rate may be too low at the optimum temperatures. We have found that in such circumstances catalysts may be satisfactorily activated in acceptable times (2 to 3 weeks) using activating hydrogen containing ammonia with circulation rates of 2.5 to 7.5 ml/min/g. of catalyst oxide and temperatures of 375° to 425° C.

The activated catalysts of our invention generally have a surface area ranging from 4 to 25 m²/g.

The activated catalyst is generally pyrophoric in air, and may, therefore, be transferred to the vessel in which it is to be used, under conditions of exclusion of oxygen, for example in a nitrogen atmosphere. Alternatively, however, the activated catalyst may be stabilised, for example by treating it with a gas having a low oxygen content, for example air diluted with nitrogen, so as to provide a surface coating of oxide on the catalyst and render it non-pyrophoric. Such a stabilised activated catalyst can readily be stored and transported, and may be restored to activity for use very rapidly by a short treatment with hydrogen.

When used in the hydrogenation of organic compounds the activated catalysts of our invention may, for example, be placed in a suitable vessel and then contacted with hydrogen and the compound to be hydrogenated, if desired in the presence of a solvent or other additive, suitably by passing a mixture of such materials through a bed of the catalyst. When used in the hydrogenation of adiponitrile it is preferred that the activated catalyst of our invention is used in a fixed bed. Hydrogen is normally used in excess over the stoichiometric amount required for reduction to hexamethylene diamine and the excess is desirably recycled or recovered for re-use. It is also preferred to carry out the hydrogenation in the presence of ammonia, preferably from 2 to 10 parts of ammonia by weight per part of adiponitrile, and since ammonia does not take part in the reaction it is desirably recycled or recovered for re-use. As is well-known when using iron catalysts the proportion of water in the reactants should be kept low, desirably below 0.2%, and preferably below 0.1% by weight.

The hydrogenation of adiponitrile using the activated catalyst of our invention may be carried out, for example at temperatures within the range 80° to 200° C. The hydrogenation is carried out under pressure, for example at a pressure within the range 20 to 500 atmospheres, but preferably within the range 200 to 400 atmospheres. We prefer to operate our process continuously and to recycle excess hydrogen and ammonia. For this purpose the activated catalyst may be contained in a suitable pressure vessel through which the reactant mixture is passed. The catalyst may be activated in situ in the reactor or may be activated in a separate vessel and transferred to the reactor. In the latter case it is preferable for the catalyst to be contained in a cartridge or other suitable container so that the activated catalyst may be transferred rapidly to the reactor out of contact with air.

When operated continuously the temperature of the catalyst bed may vary depending on the rate at which the adiponitrile is fed. The temperature of the hottest part of the bed (hot spot) may vary, for example, within the range 130° – 180° C and may be controlled at the desired temperature by controlling the feed rate. Inlet temperatures for the reactant mixture may be much lower, for example from 90° C upwards.

In hydrogenations using the activated catalyst of our invention the effluent reactant mixture is separated into its constituents and the hydrogenated product recovered by conventional methods. In the case of the hydrogenation of adiponitrile the reactant mixture may be separated into gaseous and liquid constituents for recovery of hydrogen and ammonia, and the hexamethylene diamine isolated and separated from impurities by rectification or other means according to known procedures.

It is an advantage of the use of the activated catalyst of our invention for the hydrogenation of adiponitrile that a particularly low level of impurities is achieved in the resulting hexamethylene diamine prior to any refining treatment. In particular a low level of the impurity diaminocyclohexane is achieved in comparison with other activated iron catalysts, for example in comparison with an activated iron oxide occurring naturally in Labrador and consisting principally of haematite.

Diaminocyclohexane is a very undesirable impurity in hexamethylene diamine when the latter is used in the manufacture of polyamides such as polyhexamethylene adipamide, since it gives rise to discolouration in the polyamide, and hence in fibres spun from such polyamides. Moreover, the presence of diaminocyclohexane as impurity also gives rise to difficulties in spinning such polyamides into fibres. For these reasons the level of diaminocyclohexane in hexamethylene diamine for polyamide manufacture has to be kept to very low levels, desirably below 25 parts per million, and to achieve this refining equipment has to be installed and operated. The refining operation usually includes fractional distillation, and since the boiling points of diaminocyclohexane and hexamethylene diamine are very close, costly efficient fractionating columns with a large number of theoretical plates are required. The size of the refining equipment and hence its cost necessarily increases with the proportion of diaminocyclohexane in the hexamethylene diamine as first manufactured. Hence a reduction in the diaminocyclohexane level in the crude hexamethylene diamine of a fraction of a percent has a significant effect on the cost of manufacturing refined hexamethylene diamine with the low diaminocyclohexane levels necessary for polymer manufacture.

The invention is illustrated but not limited by the following Examples.

EXAMPLE 1

A Swedish magnetite ore containing 98.47% by weight of iron oxide was fused at a temperature of 1590° C for 1 hour. After allowing to solidify the fused material was crushed so that all passed a 5 mesh (BSS) sieve and 99.6% by weight was retained on a 12 mesh (BBS) sieve. The fused material had the following analysis:

| | |
|---|---|
| Total Iron content | 70.7% |
| Ferrous Iron | 19.9 |
| Ferric Iron | 50.8 |
| Iron Oxide | 98.2 |
| Alumina ($Al_2O_3$) | 0.2 |
| Silica ($SiO_2$) | 0.5 |
| Calcium Oxide (CaO) | 0.1 |
| Vanadium Pentoxide ($V_2O_5$) | 0.2 |
| Atomic Ratio Oxygen to Iron | 1.36 : 1 |

The fused and crushed material was heated at 350° C under nitrogen for 3 hours and then heated at 450° C while hydrogen was passed over it at a rate of 10 ml/min/g. of sample for 48 hours. After cooling under nitrogen the activated catalyst was used in the hydrogenation of adiponitrile as follows. A mixture of adiponitrile with 5 times its weight of ammonia was passed at a rate of about 0.3 lbs/hr. over a 1 lb. sample of the catalyst together with hydrogen at a rate of 3.5 to 4.0 standard cubic feet/hour. The inlet temperature to the catalyst bed was 93° to 98° C and the exit temperature 94° to 104° C. The resulting product contained 98.22% of hexamethylene diamine and 0.19% of diaminocyclohexane.

EXAMPLE 2

Comparative Example

A Labrador haematite ore, all of which passed a 5 mesh (BSS) sieve and 99.2% by weight of which was retained on a 16 mesh (BSS) sieve, had the following analysis.

| | |
|---|---|
| Total Iron content | 68.4% |
| Ferrous Iron | 0.7 |
| Ferric Iron | 67.7 |
| Iron Oxide | 97.7 |
| Alumina ($Al_2O_3$) | 0.2 |
| Silica ($SiO_2$) | 1.5 |
| Calcium Oxide (CaO) | 0.2 |
| Vanadium Pentoxide ($V_2O_5$) | — |
| Atomic Ratio Oxygen to Iron | 1.49 : 1 |

It was activated with hydrogen and then used in the hydrogenation of adiponitrile in a similar manner to that described in Example 1. The resulting product contained 98.05% of hexamethylene diamine and 0.35% of diaminocyclohexane.

EXAMPLE 3

The fused and crushed Swedish magnetite ore used in Example 1 was activated by heating at a temperature within the range 320° to 420° C while passing hydrogen containing 1 to 3% by volume of ammonia for 50 hours at a rate of about 22 standard cubic feet/hour per lb. of catalyst oxide. The catalyst was heated to temperature under nitrogen, and was cooled to below 100° C under hydrogen and then purged with nitrogen. 86% of the available oxygen in the iron had been removed.

The activated catalyst was used in the hydrogenation of adiponitrile by passing adiponitrile mixed with about 6 times its weight of ammonia over the catalyst at a rate of about 0.5 lbs. of adiponitrile per hour per lb. of catalyst oxide, together with hydrogen at a rate of 23 standard cubic feet/hour per lb. of catalyst. The inlet temperature to the catalyst bed was 99° to 113° C and the highest temperature (hot spot) 150° to 160° C. The resulting product contained 99.14% of hexamethylene diamine and 0.23% of diaminocyclohexane.

EXAMPLE 4

Comparative Example

The Labrador haematite ore used in Example 2 was activated and used in the hydrogenation of adiponitrile in a similar manner to that described in Example 3. The product contained 98.51% of hexamethylene diamine and 0.42% of diaminocyclohexane.

EXAMPLE 5

The fused Swedish magnetite ore described in Example 1 was activated at the prescribed temperature for the prescribed time using the prescribed activating gas. The loss in weight of the catalyst and its surface area after activation were then measured using nitrogen adsorption for the latter. The results are indicated in the following Tables 1 to 4.

TABLE 1

Effect of Ammonia in Activating Hydrogen

| Temperature | 450° C |
| Time | 48 hours |
| Gas Rate | 10 ml/min/g. of catalyst oxide |

| Ammonia concn. in activating gas % by volume | Weight loss of catalyst % by weight | Surface area of activated catalyst m²/g. |
| --- | --- | --- |
| 0 | 27.35 | 7.08 |
| 1.5 | 27.46 | 12.68 |
| 3.0 | 27.25 | 14.54 |
| 6.0 | 27.30 | 13.90 |
| 8.0 | 27.19 | 14.00 |
| 12.0 | 27.31 | 15.16 |

TABLE 2

Effect of Water in Activating Hydrogen

| Temperature | 450° C |
| Time | 48 hours |

| Water concn. % by volume | Ammonia concn. in activating gas % by volume | Weight loss of catalyst % by weight | Surface area of catalyst m²/g. |
| --- | --- | --- | --- |
| 2.9 | 0 | 24.38 | 5.03 |
| 0.9 | 0 | 26.77 | 6.82 |
| 0.3 | 0 | 27.35 | 6.50 |
| 0.0 | 0 | 27.42 | 6.81 |
| 2.9 | 3 | 24.41 | 10.26 |
| 0.9 | 3 | 27.27 | 11.19 |
| 0.3 | 3 | 27.35 | 15.23 |
| 0.0 | 3 | 27.37 | 14.78 |

TABLE 3A

Effect of Temperature of Activation

| Gas Rate | 20 ml/min/g. of catalyst oxide |
| Activating gas | Hydrogen |

| Temp. ° C | Time Hours | Weight loss of catalyst % by weight | Surface area of catalyst m²/g. |
| --- | --- | --- | --- |
| 300 | 336 | 27.04 | 13.05 |
| 350 | 64 | 27.09 | 11.17 |
| 400 | 72 | 27.50 | 9.01 |
| 450 | 24 | 27.37 | 7.42 |

Table 3B

Effect of Temperature of Activation

| Gas rate | 20 ml/min/g. of catalyst oxide |
| Activating gas | Hydrogen + 3% by volume of ammonia |

| Temp. ° C | Time Hours | Weight loss of catalyst % by weight | Surface area of catalyst m²/g |
| --- | --- | --- | --- |
| 300 | 672 | 26.72 | 21.48 |
| 350 | 117 | 26.69 | 22.99 |
| 400 | 70 | 27.32 | 19.19 |
| 450 | 24 | 27.36 | 15.33 |

TABLE 4A

Effect of Rate of Activating Gas
Activating gas : Hydrogen

| Temp. ° C | Gas rate ml/min/g. catalyst oxide | Time Hours | Weight loss of catalyst % by weight | Surface area of catalyst m²/g. |
| --- | --- | --- | --- | --- |
| 350 | 5 | 298 | 26.96 | 9.90 |
|  | 10 | 249 | 26.98 | 10.48 |
|  | 20 | 64 | 27.09 | 11.17 |
| 400 | 5 | 151 | 27.20 | 7.36 |
|  | 10 | 118 | 27.36 | 8.18 |
|  | 20 | 72 | 27.50 | 9.01 |
| 450 | 5 | 96 | 27.12 | 6.07 |
|  | 10 | 48 | 27.35 | 7.08 |
|  | 20 | 24 | 27.36 | 7.42 |

TABLE 4B

Effect of Rate of Activating Gas
Activating gas : Hydrogen + 3% by volume of ammonia

| Temp. ° C | Gas rate ml/min/g. catalyst oxide | Time Hours | Weight loss of catalyst % by weight | Surface area of catalyst m²/g. |
| --- | --- | --- | --- | --- |
| 350 | 5 | 600 | 26.84 | 13.31 |
|  | 10 | 240 | 26.23 | 19.72 |
|  | 20 | 117 | 26.69 | 22.99 |
| 400 | 5 | 162 | 26.90 | 13.98 |
|  | 10 | 110 | 27.11 | 16.13 |
|  | 20 | 70 | 27.32 | 19.19 |
| 450 | 5 | 96 | 27.16 | 13.91 |
|  | 10 | 48 | 27.25 | 14.54 |
|  | 20 | 24 | 27.36 | 15.33 |

We claim:
1. A catalyst composition for use in the hydrogenation of organic compounds consisting of a fused and solidified iron oxide crushed to particles of a size ranging between 3 to 20 mesh (BSS) suitable for use in a fixed bed of catalyst, the fused material containing not less than 96.5% of iron oxide, which oxide has an atomic ratio of oxygen to iron within the range 1.2:1 to 1.4:1.

2. The catalyst composition as claimed in claim 1 in which the atomic ratio of oxygen to iron is within the range 1.33 : 1 to 1.37 : 1.

3. The catalyst composition as claimed in claim 1 obtained by fusing a magnetite.

4. A catalyst composition of claim 1 consisting of a fused and solidified iron oxide in the form of particles suitable for use in a fixed bed of catalyst, the fused material containing not less than 96.5% of iron oxide, which oxide has an atomic ratio of oxygen to iron within the range 1.2:1 to 1.4:1, activated by heating the said catalyst in the presence of hydrogen at a temperature above 200° C but not above 600° C and at pressures up to 500 atmospheres.

5. The catalyst of claim 4 in which activation is continued until at least 95% by weight of the available oxygen in the iron has been removed.

6. The catalyst of claim 4 in which the hydrogen used for activation contans from 0.25% to 25% by volume of ammonia.

7. The catalyst of claim 4 in which the activating hydrogen contains no ammonia and less than 1% by volume of water as fed to the catalyst, in which the activating temperature is 275° to 325° C, and in which the activating hydrogen is passed over the catalyst at a rate of at least 7.5 ml/min/g. of catalyst oxide.

8. The catalyst of claim 6 in which the activating hydrogen contains less than 1% by volume of water as fed to the catalyst, in which the activating temperature is 325° to 375° C, and in which the activating hydrogen is passed over the catalyst at a rate of at least 7.5 ml/min/g. of catalyst oxide.

9. The catalyst of claim 6 in which the activating temperature is 375° to 425°, and in which the activating hydrogen is passed over the catalyst at a rate of from 2.5 to 7.5 ml/min/g. of catalyst oxide.

10. The catalyst of claim 1, wherein iron oxide, mixture of iron oxides or a mixture of iron oxide and iron has been heated to temperatures above about 1380° C to produce said fused material.

* * * * *